Patented June 29, 1937

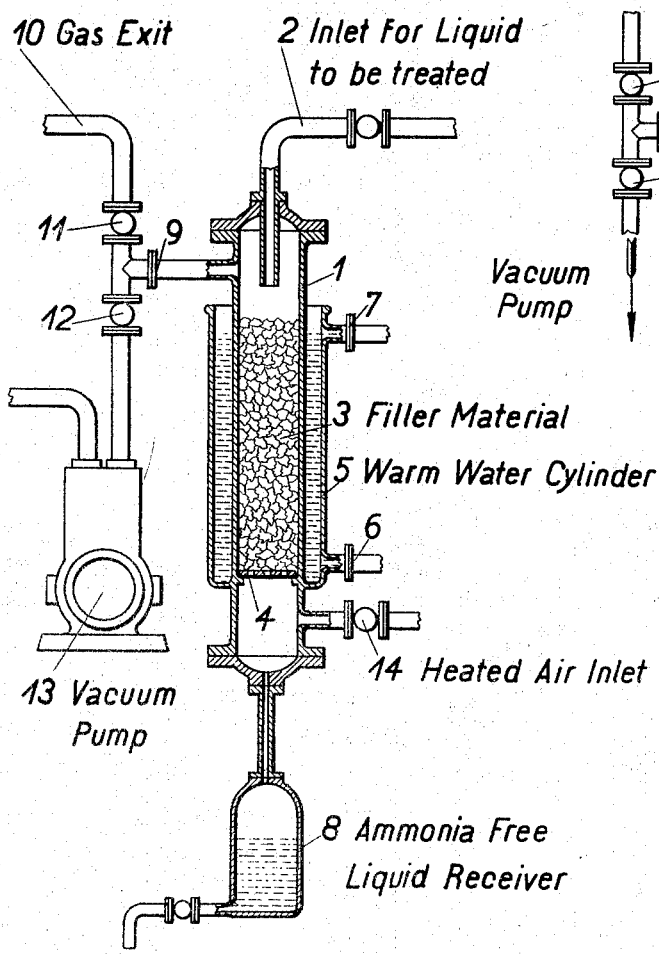
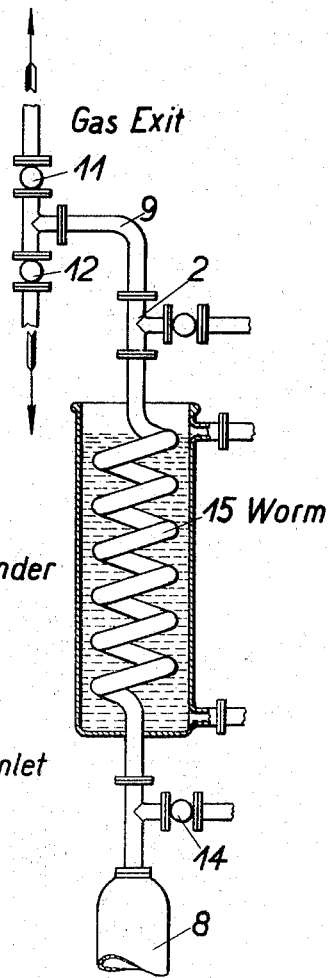
Fig.1.
Fig.2.

2,085,679

UNITED STATES PATENT OFFICE 2,085,679

METHOD OF PRODUCING AMINO-NITRILES

Wilhelm Gluud, Walter Klempt, and Fritz Brodkorb, Dortmund-Eving, Germany, assignors to Gesellschaft für Kohlentechnik m. b. H., Dortmund-Eving, Germany Application September 17, 1934, Serial No. 744,464
In Germany September 21, 1933

6 Claims. (Cl. 260—99.30)

This invention relates to a method for producing aminonitriles and more particularly to a method for producing amino-acetonitrile and amino-propionitrile.

It is known to prepare amino-acetonitrile by acting with ammonia on hydroxy-acetonitrile. Hitherto the ammonia has been used as an aqueous or alcoholic solution saturated under atmospheric pressure and at room temperature. In this case amino-acetonitrile may be obtained in an almost theoretical yield as is pretended in the literature. However, an examination of these known prescriptions for the purpose of technical employment has shown that these prescriptions are not fit because firstly the desired product is not obtained at all in theoretical yield (as will be pointed out below), and secondly liquors of very large volumes are to be used in order to invest these liquors with the great quantities of ammonia required to achieve in some degree a satisfactory conversion of the hydroxy-acetonitrile.

Now the inventors have found that this conversion may be carried out much more easily and with a considerably increased yield on using liquefied ammonia or an aqueous or alcoholic solution of ammonia in which the $NH_3$ has a considerable hyperpressure instead of using an aqueous or alcoholic solution saturated at room temperature and under atmospheric pressure, the $NH_3$-concentration of which is only limited. On using liquefied ammonia for example, after an action of 12 to 36 hours at room temperature no more cyanogen is traceable. Besides this time is reduced still by working at elevated temperature. On working up the reaction mixture yields of about 80 to 92% are obtained, for example as the hydrochloride of the ethyl ester of glycine.

The conversion is very tedious at temperatures below 33° C.; if carried out in a closed vessel (autoclave) at room temperature, however, the velocity of the conversion is satisfactory, as stated above, and will be increased still at elevated temperature. In some cases it is advantageous to use a mixture of ammonia with small quantities of a diluting agent, such as alcohol or water instead of pure ammonia. A diluting agent is advantageous because in the presence of such an agent after distilling off the ammonia no concentrated aminonitrile or a nitrile of high percentage is obtained which under certain conditions cannot be handled without danger. Nevertheless a high concentration of the aminonitrile should be aimed at if possible.

If an aqueous and very oversaturated solution of ammonia is used, the small quantity of the present water acts as a diluting agent. For this purpose the small quantity of water which is present on employing a solution of oxy-acetonitrile of 40 to 80% and more is feasible. Such a diluted solution of hydroxy-acetonitrile is obtained for example by acting with liquid hydrocyanic acid or with HCN containing but little water on an aqueous solution of formaldehyde of 40%. If need be, a more concentrated solution of hydroxy-acetonitrile is obtained by passing the solution mentioned above through a passage apparatus which will be described below. In this case it is only necessary to saturate the solution of hydroxy-acetonitrile with gaseous ammonia at so low a temperature that the ammonia is liquefied, and allow the reaction mixture to stand some time at room temperature in a closed vessel. By heating the vessel to about 40° C. the reaction time is reduced to nearly one hour. On working in this manner a hyperconcentration of the amino-acetonitrile which involves losses and dangers is avoided.

In the manner pointed out above substantially a solution of amino-acetonitrile in liquefied ammonia is obtained. Besides this solution may contain small quantities of water or other organic liquids, such as alcohol. If the amino-acetonitrile is to be worked up it is necessary in many cases to remove the excess of ammonia. This is necessary above all if the amino-acetonitrile is to be converted to glycine by hydrolysis with a strong acid, such as sulphuric acid. It is obvious that a large excess of ammonia requires much acid so that in case of using sulphuric acid for example large quantities of ammonium sulphate are obtained. It would be natural to remove the excess of ammonia by simply heating the whole quantity of the ammoniacal solution of amino-acetonitrile after having removed the bulk of ammonia by allowing it to evaporate. This method is not favorable because the aminoacetonitrile inclines more to decomposition as less ammonia is present in the solution. In several cases, therefore, a very vehement explosion-like decomposition of the highly concentrated solution of the amino-acetonitrile has taken place, especially if but little water was present.

The inventors have found further that in spite of the inclination of the amino-acetonitrile to decomposition the removal of the excess of ammonia may be carried out easily and without danger if care is taken that only small quantities of the liquid at a time are freed from the ammonia. In practice this is achieved in a simple manner by causing the ammoniacal solution of amino-acetonitrile to pass a more or less heated passage apparatus, such as a heated tube. This apparatus may be kept under vacuo if so desired. Sometimes this process is promoted by passing a current of moderately heated air through the apparatus. In this case the exhalation of the ammonia takes place very rapidly and the reduction of the temperature hereby is sufficient to avoid a decomposition of the amino-acetonitrile so that practically the whole of amino-nitrile is obtained free from ammonia and fit for carrying out the hydrolysis of the cyanogen radical with acids.

The technical and economical effect of the new process is based on the fact that instead of using high-priced alkali metal or alkali earth metal hydroxides, such as barium hydroxide, for the hydrolysis the very cheap sulphuric acid may be employed, and that the nitrogen of the cyanogen radical, —CN, is recovered immediately as a marketable fertilizer, i. e. ammonium sulphate.

Of the following Examples (b), (c), and (d) illustrate the advantages of the new process compared with the known art. The inventors, however, do not desire to be limited to the following disclosures except as may be required by the claims.

(a) Preparation of amino-acetonitrile by acting with ordinary concentrated aqueous solution of ammonia on hydroxy-acetonitrile.—500 ccm. of an aqueous solution of hydroxy-acetonitrile (35%=175 grams hydroxy-acetonitrile) are mixed at room temperature with 2500 ccm. of aqueous ammonia solution of 30%. The mixture is allowed to stand 12 hours. 490 grams barium hydroxide are added to the ammoniacal solution of amino-acetonitrile so obtained whereupon the mixture is shaken 30 hours at room temperature. Carbon dioxide is introduced into the mixture heated to 70° C. until the whole of barium is precipitated as carbonate. This barium carbonate is filtered off and washed with some water. The filtrate is concentrated to 200 ccm., whereupon alcohol is added to the hot solution. After cooling (refrigerator) the crystallized glycine is filtered off and dried.

Yield: 123.2 grams, i. e. 64 3% of the the:ry, referred to the hydroxy-acetonitrile employed.

(b) Preparation of amino-acetonitrile by acting with a mixture of liquefied ammonia and alcohol on a solution of hydroxy-acetonitrile.—275 grams of ammonia liquefied at a temperature of −30 to −33° C. are mixed with 175 grams alcohol. 255 grams of an hydroxy-acetonitrile of 90% (=228 grams hydroxy-acetonitrile) are added to this mixture which is allowed then to stand 36 hours in a closed vessel at room temperature. The ammonia is distilled off and the solution of the amino-acetonitrile is worked for glycine in any known manner.

If the hydrochloride of the ethyl ester of glycine is to be prepared the solution of amino-acetonitrile is introduced into a strong alcoholic hydrochloric acid. The mixture is heated for some time, the precipitated ammonium chloride is filtered off, and the liquid is allowed to crystallize, whereby the hydrochloride of the ethyl ester of glycine is precipitated. If the precipitation of this compound does not take place in a satisfactory yield the method of esterification may be repeated.

On preparing the hydrochloride of the glycine ether the yield amounts to 513 grams, i. e. 86% of the theory referred to the quantity (228 grams) of the hydroxy-acetonitrile employed.

(c) Preparation of amino-acetonitrile by acting with liquefied ammonia on hydroxy-acetonitrile. —2000 ccm. of an hydroxy-acetonitrile of 95% are stirred at room temperature into 1750 grams of liquefied ammonia in a closed vessel. The vessel is then heated 3 to 4 hours to about 45 to 50° C. After cooling the vessel and distilling off the excess of ammonia the liquid is subjected to hydrolysis as described under Example (a) and worked for glycine. 2100 grams of glycine are obtained, the yield thus amounting to 84%.

(d) Preparation of α-amino-propionitrile by acting with liquefied ammonia on α-hydroxy-propionitrile.—487 grams of α-hydroxy-propionitrile, present in the form of 720 ccm. of an aqueous solution are slowly pressed while cooling with the aid of a pump at room temperature into an autoclave provided with a stirring and cooling device and containing 300 grams of liquefied ammonia. The autoclave is heated at 45° C. and the reaction mixture stirred at this temperature 1½ hours whereafter the practically quantitative reaction (98 to 99% yield) is finished. The excess of ammonia is allowed to distill off.

In order to carry out an exact estimation of the α-amino-propionitrile the solution remaining in the autoclave is slowly stirred into a warm (90 to 100° C.) solution of 1250 grams barium hydroxide in 1500 ccm. water. After having carried out the hydrolysis carbon dioxide is introduced whereby the alanine present in the form of its barium salt is set free and the barium precipitated as carbonate. The barium carbonate is filtered off and washed. The filtrate is concentrated in vacuo and alcohol is then added to the concentrated aqueous solution, alanine being thus precipitated in a quantity of 490 grams (melting point: 270° C.). The yield amounts to 80% of the theory. The alanine remaining in the mother lye may be recovered by further concentrating and adding alcohol.

(e) In the following an example is given for the method of concentrating an ammoniacal solution of amino-acetonitrile in the passage apparatus.

In the drawing devices embodying this apparatus are illustrated by way of example.

Fig. 1 is a longitudinal section of an apparatus in which the ammonia still present in the solution is removed by distillation by causing the liquid to pass an upright tube filled with pearls or rings or the like and heated to about 40 to 45° C.

Fig. 2 is a longitudinal section of an apparatus in which the distillation is carried out in a worm.

Referring to Fig. 1, the liquid to be treated enters the tube 1 by pipe 2. Tube 1 is filled with a layer 3 of rings or pearls rested upon a grate 4. This tube is surrounded by a cylinder 5 through which warm water is passed, entering through pipe 6 and leaving through pipe 7. The liquid freed from NH₃ is collected in the vessel 8. The gaseous ammonia driven off leaves tube 1 through pipes 9 and 10. In this case valve 11 is opened and valve 12 closed. If the distillation is to be carried out under vacuo, valve 11 is closed and valve 12 opened so that the outcoming gases are caused to pass the vacuum pump 13. Moderately heated air may be admitted to tube 1 through valve 14 in order to promote the distillation of the ammonia if so desired.

In Fig. 2 the tube 1 of Fig. 1 is replaced by a worm 15 surrounded by a water jacket similar to that shown in Fig. 1. This worm does not contain pearls or rings. The other details of Fig. 2 are the same shown in Fig. 1 and correspondingly numbered.

58 grams of a solution of hydroxy-acetonitrile (98.5%) are introduced with the aid of a pressure-pump into 85 grams of liquefied ammonia placed in a closed vessel provided with a stirring and cooling device whereupon the vessel is moderately heated in a waterbath. After cooling the vessel and allowing the proportion of the NH₃ escaping by itself to blow off the liquid is caused to pass into the passage apparatus described above. During 4 to 6 minutes the solution passes this apparatus. The outcoming liquid is practically free from NH₃ and worked up with alcoholic hydrochloric acid for the hydrochloride of the ester of glycine. The quantity of the compound so obtained amounts to 125 grams corresponding to a yield of about 91%. This high yield makes evident that the formed amino-acetonitrile is practically not destroyed by removing the excess of ammonia. In practice it is more satisfactory to carry out the hydrolysis of the amino-acetonitrile with sulphuric acid. Nevertheless the method of hydrolysis given above is preferable for estimating the yield in the laboratory.

What is claimed as new is:

1. A method of producing amino-nitriles which consists in treating the nitriles of α-hydroxy-aliphatic carboxylic acids with an excess of liquefied ammonia in a closed vessel and then removing the excess of ammonia by running the liquid while heating in a thin film over large surfaces.

2. A method according to claim 1, in which the acting with liquefied ammonia in excess on the said nitriles in a closed vessel is carried out at temperatures elevated to about 45 to 50° C.

3. A method according to claim 1, in which for the purpose of acting on the said nitriles liquefied ammonia is used which contains water but less water than an aqueous ammonia solution saturated at room temperature and under atmospheric pressure.

4. A method according to claim 1, in which for the purpose of acting on the said nitriles liquefied ammonia at temperatures elevated to about 45 to 50° C. is used which contains water but less water than an aqueous ammonia solution saturated at room temperature and under atmospheric pressure.

5. A method according to claim 1, in which for the purpose of acting on the said nitriles liquefied ammonia is used which contains alcohol but less alcohol than an alcoholic ammonia solution saturated at room temperature and under atmospheric pressure.

6. A method according to claim 1, in which for the purpose of acting on the said nitriles liquefied ammonia at temperatures elevated to about 45 to 50° C. is used which contains alcohol but less alcohol than an alcoholic ammonia solution saturated at room temperature and under atmospheric pressure.

WILHELM GLUUD.
WALTER KLEMPT.
FRITZ BRODKORB.